United States Patent [19]

Botz et al.

[11] 4,241,260

[45] Dec. 23, 1980

[54] MOTORIZED HEADLAMP POSITION ADJUSTING CIRCUIT

[75] Inventors: Jakob Botz, Ingersheim; Erich Mutschler; Adam Weber, both of Bietigheim-Bissingen, all of Fed. Rep. of Germany

[73] Assignee: ITT Industries, Inc., New York, N.Y.

[21] Appl. No.: 9,659

[22] Filed: Feb. 5, 1979

[30] Foreign Application Priority Data

Feb. 14, 1978 [DE] Fed. Rep. of Germany ....... 2806131

[51] Int. Cl.³ .............................................. B60Q 1/06
[52] U.S. Cl. ................................ 307/10 LS; 318/467
[58] Field of Search ................. 307/10 LS, 9; 362/71; 315/82; 318/282, 467

[56] References Cited

U.S. PATENT DOCUMENTS 3,989,954  11/1976  Weiner ............................ 307/10 LS
4,162,424   4/1979  Zillgitt et al. ............... 307/10 LS X

FOREIGN PATENT DOCUMENTS 2637326  6/1977  Fed. Rep. of Germany ...... 307/10 LS
 384637  1/1933  United Kingdom ................ 307/10 LS Primary Examiner—L. T. Hix
Assistant Examiner—James L. Dwyer
Attorney, Agent, or Firm—James B. Raden; Donald J. Lenkszus

[57] ABSTRACT

A motorized headlamp position adjusting circuit for adjusting the angular position of a vehicular headlamp includes two motor position switches and an operating switch interconnected such that the number of wires to the control switch is reduced.

6 Claims, 3 Drawing Figures

MOTORIZED HEADLAMP POSITION ADJUSTING CIRCUIT

CROSS-REFERENCE TO RELATED APPLICATIONS

Device For Adjusting The Inclination Of Motor Vehicle Headlamps by E. Mutschler et al, Ser. No. 961,734 filed Nov. 17, 1978 and assigned to a common assignee.

Motor Driven Adjusting Device by R. Ade et al, Ser. No. 941,749 filed Sept. 12, 1978 and assigned to a common assignee.

BACKGROUND OF THE INVENTION

1. Field of the Invention

This invention pertains to a motor driven device for adjusting the inclination of motor vehicle headlamps.

2. Description of the Prior Art

Such devices are increasingly installed in modern motor vehicles to prevent the headlamps from blinding oncoming traffic when, for example, the motor vehicle is carrying a heavy load. In known mechanisms of this kind, the headlight is swiveled round a horizontal axis by means of a crank gear. In such mechanisms, the direction of rotation of the electric motor must be variable in order to provide that the headlight can be brought into the right position as quickly as possible without having thereby to pass through the dead position of the crank gear. Passing through the dead position can, under certain circumstances, result in a momentary directing of the headlights towards the oncoming traffic.

In a known device complying with this requirement, the operating switch has two mechanically coupled bridging contacts in two switching planes, through which the positive and negative terminals of the supply voltage source can be connected to one each of n stationary contacts, whereby n corresponds to the number of desired adjusting possibilities. These 2 n stationary contacts are each connected to a slide spring by means of a lead and cooperate with a switching disk connected with the motor shaft in a manner that is protected against torsion. The switching disk is provided on both sides with two contact paths separated from each other by insulation and provided with contact gaps. On each of these four contact paths, a slide spring resiliently rests. The slide springs are coupled in pairs and connected with the motor current supply lead. The electric motor is fed with operating current through these contact paths and the slide springs as long as the slide springs being applied to voltage will meet the contact gaps. Thus, it is ensured that the electric motor will be stopped in the right position by the switching disk which in connection with the slide springs forms positions switches.

In this embodiment, the operating switch is connected to the electric motor through 2 n leads. One pair of these leads conducts the motor operating current and therefore must have a suitable cross-section. Furthermore, the operating switch with two switching planes and 2 n contacts is of complicated design. Also, 2 n+4 slide springs are necessary to provide the position switches for stopping the electric motor in the right position. The production of switching disks provided with contact paths on both sides is relatively expensive.

DE-OS 2,637,326 teaches a circuit arrangement wherein the reversal of polarity of the voltage source and thereby reversal of rotation is not accomplished through a complicated switch disk. A reversing switch operating in dependence on the direction of switching is integrated in the operating switch. However, n+1 leads are still necessary between operating switch and electric motor. However, although the switch disk can be produced more economically, the construction of the operating switch is very complicated.

SUMMARY OF THE INVENTION

In accordance with the principles of the invention, a control circuit for a motorized headlamp position adjusting arrangement includes a minimal number of connections between an operating switch and motor position switches. Further, in accordance with the invention, when the control switch is rapidly changed from one headlamp determining position to another, the motor will be actuated such that a minimal rotation is required to obtain the desired headlamp position. When the motor attains the desired position, the control circuit electrodynamically brakes the motor.

In an embodiment, in accordance with the invention, the desired adjusting position is predetermined by the switching position of the operating switch. The rotational direction of the electric motor results from the position of the position switch. Thus, in case of interruption, the electric motor automatically runs into the desired adjusting position or into the adjusting position predetermined by the operating switch and then is electrodynamically braked by a short circuit.

Further, in accordance with the invention in a circuit arrangement having n switching position, the electric motor must have n+1 connecting leads if n is an even number, but only n connecting leads if n is an odd number. At least one lead can directly conduct to the voltage source when the body of the vehicle is connected to one terminal of the battery. Further, a lead conducting to the other battery terminal can be saved under certain circumstances due to the fact that an adjusting motion of the headlamps is typically only carried out when the low beam or high beam is switched on. In this case, one terminal can directly be coupled with the corresponding terminal of the headlamp bulb. At any rate, only n−1 connecting wires are necessary between operating switch and electric motor.

DESCRIPTION OF THE DRAWINGS:

The invention may be better understood from a reading of the following detailed description of several embodiments taken in conjunction with the drawings in which.

DETAILED DESCRIPTION OF THE DRAWINGS

Figure 1:
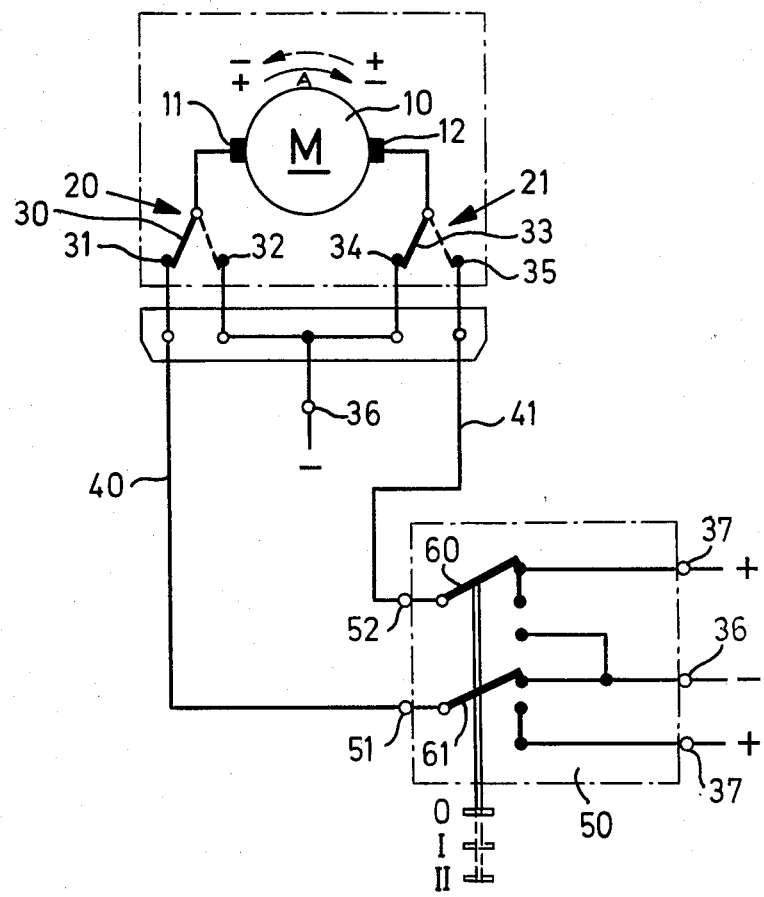
FIG. 1 illustrates in schematic form a control circuit for a headlamp adjusting arrangement having three positions.

An electric motor 10 is provided for the adjustment of a headlamp which is to be swiveled round a horizontal axle. The connections of the motor to the headlamp are not shown. Electric motor 10 has two terminals 11 and 12. In the embodiment according to FIG. 1, two position switches 20 and 21 are actuated by the electric motor 10. The position switch 20 has a movable switch contact 30 being connected with the motor terminal 11 and cooperating with two stationary contacts 31 and 32. The other position switch 21 also has a movable switch contact 33 which is connected to the motor terminal 12 and cooperates with the stationary contacts 34 and 35. The two stationary contacts 32 and 34 are connected to the negative terminal 36 of a voltage source not shown in detail.

The stationary contact 31 is connected to the output 51 of a position switch 50 via a connecting wire 40. A connecting wire 41 is conducted from the stationary contact 35 to the other output 52 of the operating switch. The operating switch has two bridging contacts 60 and 61 which are electrically insulated from each other, but mechanically coupled with one another. These bridging contacts can jointly be adjusting into three switching positions identified as 0, I and II and cooperate with contact paths connected to the positive terminal 37 and the negative terminal 36 of the voltage source. In the switching positions 0 and I, positive potential is applied to the output 52, whereas in the switching position II, negative potential is applied. In the switching position 0, the negative potential is applied to the output 51. A positive potential is applied to output 51 in the switching positions I and II. Upon changing over from the switching position 0 into the neighboring switching position I, the potential on the output 51 changes. Upon changing over from the switching position I into the switching position II, the potential on the output 52 changes. It can be seen that in the switching position I, positive potential is applied to both terminals 51 and 52.

Before the functional operation of the circuit arrangement is described in detail, the operation of the position switches will be described. Position switches 20 and 21 can be designed as snap switches controlled by cams which are driven by the electric motor. If one starts from the rest position shown in the drawing and takes a maximum adjusting angle of 180° as a basis, the movable switch contact 33 of the position switch is to be changed over on the stationary contact 35 after an adjusting angle of 90° is reached. The movable switch contact 30 of the position switch 20 is changed over to the stationary contact 32 after an adjusting angle of 180° is reached. Thus, the position switches are reversed by turns. If now the direction of rotation of the electric motor 10 is changed, the movable switch contact 30 at first remains in conductive connection with the stationary contact 32. The changeover contact 33 of the position switch 21 is only changed over when the motor has run back into its initial position (adjusting angle 0). Thus, it is to be stated that the position switches show a hysteresis behavior. Upon reversal of the direction of rotation, the position switches switch in reverse order.

When the operating switch is changed over from the shown switching position into the switching position I, the potential on the output 51 jumps on a positive value. The electric motor 10 rotates in direction of the solid arrow A. When the adjusting position, predetermined by the operating switch, is reached, the changeover contact 33 jumps over to the stationary contact 35 which, via the lead 41, is connected to the output 52 of the operating switch 50 conducting positive potential in the switching position I. The electric motor is short-circuited and braked. When the operating switch is adjusted into the switching position II, this short circuit is interrupted because the potential on the output 52 changes over to ground. The electric motor continues to rotate in the same direction until in the other end position the movable switch contact 30 jumps on the stationary contact 32 connected to ground. The electric motor 10 is again short-circuited.

When the operating switch is reset into the switching position I, positive potential is conducted to the motor terminal 12 via the movable bridging contact 60, output 52, connecting wire 41, stationary contact 35 and movable switch contact 33. The electric motor 10 is reversed and runs into the desired adjusting position until the movable switch contact 30 changes over to the stationary contact 31. Then the motor is again short-circuited. When the operating switch is reset to 0, the short circuit is again interrupted because the potential on the output 51 changes. The electric motor 10 runs back into its initial position until the other position switch 21 responds and its switch contact 33 is changed over to the stationary contact 34.

Thus, it can be recognized from the above operational description that upon adjustment of the operating switch from one switching position into a neighboring one, the potential changes on the output of the position switch through which the braking circuit was closed before and the electric motor then will operate the position switch connected to the other output. When the operating switch is combined with the position switch in such a manner, the operating switch only indicates the adjusting position, whereas the direction of rotation of the motor is determined by the position of the position switch.

This circuit arrangement differs from prior circuit arrangements in that position switches are interposed in both motor current supply leads, whereas previously position switches are only provided in one motor current supply lead.

Figure 2:
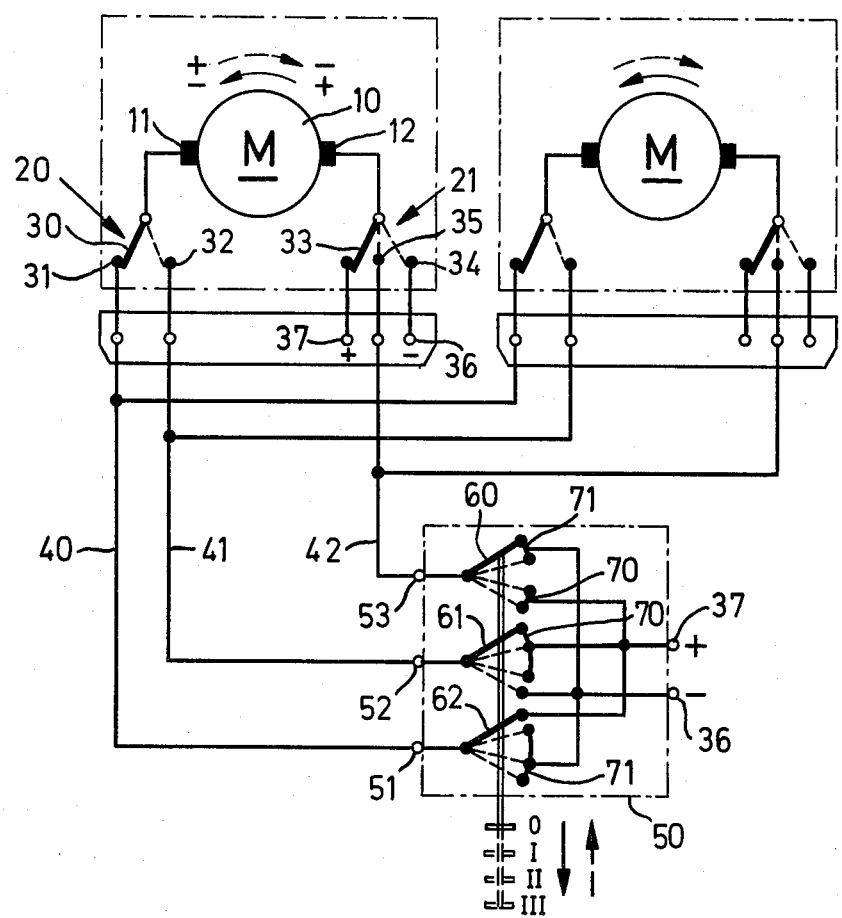
FIG. 2 illustrates in schematic form a control circuit for a headlamp adjusting arrangement having four positions.

FIG. 2 shows an embodiment for four adjusting positions according to the switching positions 0, I, II and III.

When, starting from the rest position shown, the position switch is changed over into the switching position I, only the potential on the output 51 changes. The electric motor rotates until upon reaching an adjusting angle of 60°, the movable changeover contact 33 of the position switch 21 is switched over to the central stationary contact 35 which is connected to ground via the connecting wire 42 and the bridging contact 60. The electric motor is braked. In switching position II of the operating switch 50, the potential on the output 53 is changed via the bridging contact 60, the braking circuit is interrupted and the electric motor 10 runs in the same direction of rotation until the switch contact 30 of the other position switch 20 jumps over to the stationary contact 32 which, via the connecting wire 41 at the output 52 and via the bridging contact 61, is applied to positive potential. The electric motor is again short-circuited. In switching position III, just the potential on output 52 changes, the electric motor 10 again is started in the same direction or rotation until the movable switch contact 33 of the other position switch 21 jumps over to the stationary contact 34 connected to ground. The motor is again short-circuited.

When the operating switch is reset from the switching position III into the switching position 0, the process is reversed such that at first the switch contact 33 is changed over to the stationary contact 35. In the next switching position, the switch contact 30 and also the switch contact 33 return again to the position shown.

FIG. 2 also illustrates that two drive units can be directly coupled with each other. Switching off in the proper position is thereby ensured also at different speeds of rotation.

Figure 3:
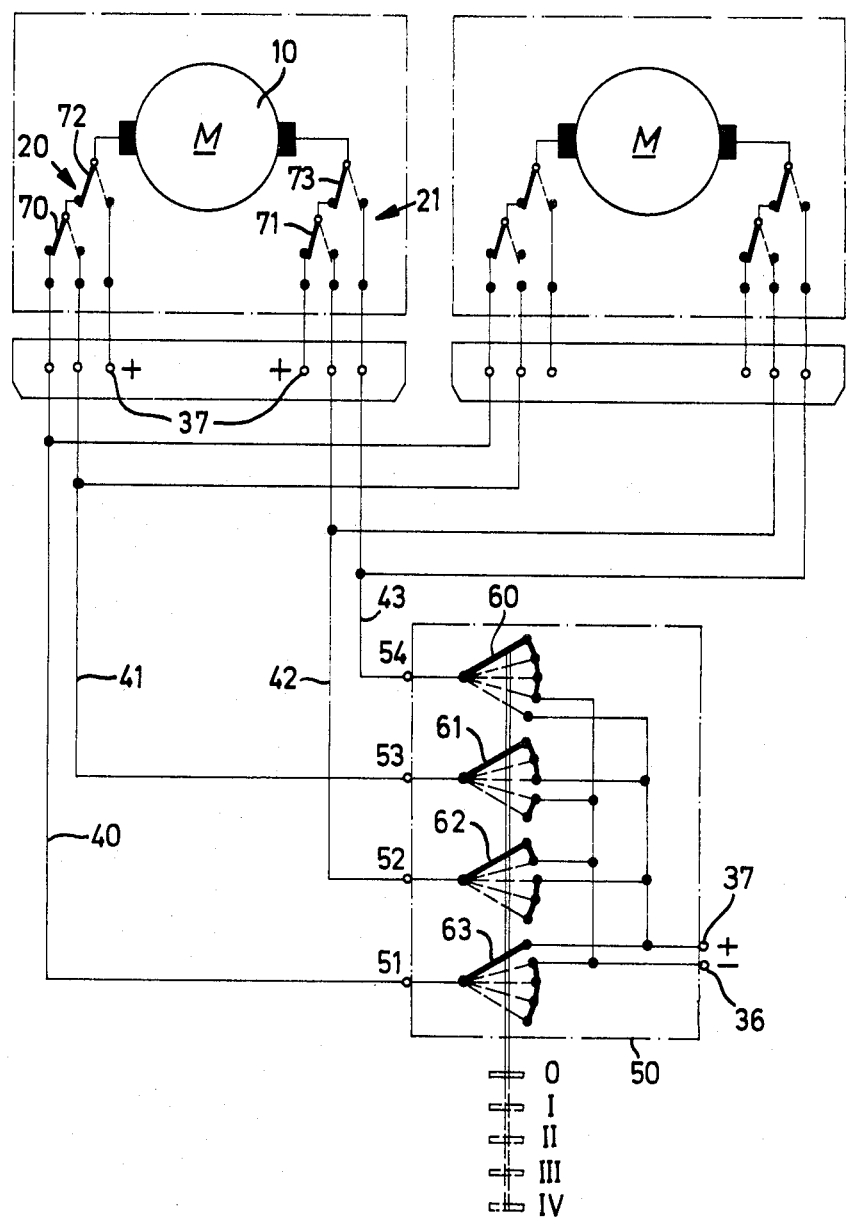
FIG. 3 illustrates in schematic form a control circuit for a headlamp adjusting arrangement having five positions.

Finally, FIG. 3 shows an embodiment with five adjusting positions. The operating switch 50 has four outputs 51 to 54 now which are connected to the stationary contacts of the position switches 20, respectively 21 via corresponding connecting wires 40 to 43. The remaining stationary contacts are directly connected to the voltage source. The mode of operation corresponds to that of the circuit arrangements of FIGS. 1 and 2, whereby as a further illustration, it is pointed out that starting from the switching position shown, at first the changeover contact designated by 70 is changed over, in the next stage, the one designated by 71, then the changeover contact 72 and finally the one designated by 73. FIG. 3 is to show how, by series connection of movable changeover contacts, the circuit arrangement can systematically be enlarged to include further adjusting positions. It is, of course, possible to combine these series-connected changeover contacts and make them work with more than two stationary contacts as this is shown in FIG. 2 with respect to the position switch 21. A comparison of the three embodiments shows that in FIGS. 1 and 3, the stationary contacts of the position switches which are not connected to the connecting wires are all switched to the same terminal of the voltage source, whereas in FIG. 2, positive and negative potentials have to be conducted to the stationary contacts. If one relates the number of necessary leads to the electric motor to the possible switching positions, the result is that embodiments having an odd number of switching positions are more favorable.

What is claimed is:

1. A control circuit for a motorized headlamp position adjusting arrangement, comprising:
    a motor having first and second terminals;
    a voltage source having first and second polarities;
    a first position switch having a hysteresis switching characteristic and comprising a movable contact connected to said first terminal and a first plurality of stationary contacts;
    a second position switch having a hysteresis switching characteristic and comprising a movable contact connected to said second terminal and a second plurality of stationary contacts;
    a multiposition operating switching having at least three switching positions and comprising a first plurality of input terminals, a second plurality of input terminals, first and second output terminals, and first and second bridging contacts, said first and second bridging contacts being respectively coupled to said first and second output terminals, said first and second bridging contacts being jointly movable to each of said switching positions such that in each switching position said first bridging contact contacts one of said first plurality of input terminals and said second bridging contact contacts one of said second plurality of input terminals;
    means connecting predetermined input terminals of said first and second pluralities of input terminals to said first polarity of said voltage source;
    means connecting the remaining input terminals of said first and second pluralities of input terminals to said second polarity of said voltage source;
    said first plurality of input terminals being arranged such that when said first bridging contact is in a first one of said switching positions one of said predetermined input terminals of said first plurality input terminals is contacted, and when in a second adjacent one of said switching positions one of said remaining input terminals of said first plurality of input terminals is contacted;
    a first conductor connecting said first output terminal to one of said first plurality of stationary contacts, and a second conductor connecting said second output terminal to one of said second plurality of stationary contacts; and
    means connecting other ones of said first and second plurality of stationary contacts to said voltage source.

2. A control circuit in accordance with claim 1, wherein said connecting means comprises a common connection between the remaining ones of said first and second pluralities of stationary contacts and said voltage source.

3. A control circuit in accordance with claim 1, wherein said operating switch has at least four switching positions and comprises a third output terminal, said control circuit further comprising a third conductor connecting said third output terminal to a second one of said first plurality of stationary contacts.

4. A control circuit in accordance with claim 3, wherein said connecting means comprises means for connecting a second one of said second plurality of stationary contacts to said first polarity of said voltage source and means for connecting a third one of said second plurality of stationary contacts to said second polarity of said voltage source.

5. A control circuit in accordance with claim 1 or 3, wherein said first and second positions switches each comprise a snap switch.

6. A control circuit for a motorized headlamp position adjusting arrangement, comprising:
    a motor having first and second terminals;
    a voltage source having first and second polarities;
    an operating switch for selecting predetermined headlamp positions, said operating switch including a plurality of groups of stationary contacts, a corresponding plurality of output terminals, a corresponding plurality of bridging contacts, each of said bridging contacts being coupled to a corresponding one of said plurality of output terminals and adapted to selectively contact said stationary contacts in a corresponding one of said plurality of groups of stationary contacts, and actuating means mechanically coupling said plurality of bridging contacts;
    first position switch means having a movable contact connected to said first terminal and having a first plurality of stationary contacts, said first position switch means being adapted to establish a connection between said first terminal and a predetermined one of said first plurality of stationary contacts when the shaft of said motor is in a first position and to establish a connection between said first terminal and a predetermined different one of said first plurality of stationary contacts when said shaft is in a second position;

second position switch means having a movable contact connected to said second terminal and having a second plurality of stationary contacts, said second position switch means being adapted to establish a connection between said second terminal and a predetermined one of said second plurality of stationary contacts when said shaft is in a third position and to establish a connection between said second terminal and a predetermined different one of said second plurality of stationary contacts;

means for connecting first predetermined ones of said first and second plurality of stationary contacts to said voltage source; and means connecting second predetermined ones of said first and second plurality of stationary contacts to said output terminals.

* * * * *